(12) United States Patent
Stadtfeld et al.

(10) Patent No.: US 10,099,300 B2
(45) Date of Patent: Oct. 16, 2018

(54) PERIPHERAL CUTTING TOOL UTILIZING STICK BLADES

(71) Applicant: THE GLEASON WORKS, Rochester, NY (US)

(72) Inventors: Hermann J. Stadtfeld, Webster, NY (US); Benjamin D. Church, Honeoye Falls, NY (US)

(73) Assignee: THE GLEASON WORKS, Rochester, NY (US)

( * ) Notice: Subject to any disclaimer, the term of this patent is extended or adjusted under 35 U.S.C. 154(b) by 262 days.

(21) Appl. No.: 14/911,055

(22) PCT Filed: Aug. 25, 2014

(86) PCT No.: PCT/US2014/052479
§ 371 (c)(1),
(2) Date: Feb. 9, 2016

(87) PCT Pub. No.: WO2015/034699
PCT Pub. Date: Mar. 12, 2015

(65) Prior Publication Data
US 2016/0175950 A1    Jun. 23, 2016

Related U.S. Application Data

(60) Provisional application No. 61/873,477, filed on Sep. 4, 2013.

(51) Int. Cl.
*B23C 5/22* (2006.01)
*B23F 21/14* (2006.01)
(Continued)

(52) U.S. Cl.
CPC .............. *B23C 5/2295* (2013.01); *B23C 5/08* (2013.01); *B23F 21/106* (2013.01); *B23F 21/146* (2013.01); *B23C 2210/161* (2013.01)

(58) Field of Classification Search
CPC ...... B23F 21/106; B23F 21/146; B23C 5/226; B23C 5/2406; B23C 5/2489;
(Continued)

(56) References Cited

U.S. PATENT DOCUMENTS 579,570 A * 3/1897 Fellows ................. B23F 21/10
407/28
1,392,361 A * 10/1921 Sears .................... B23F 21/106
407/28
(Continued)

FOREIGN PATENT DOCUMENTS

| AT | 006939 U1 | 6/2004 | |
|---|---|---|---|
| FR | 947074 A | 6/1949 | |
| JP | 05116027 A * | 5/1993 | ............ B23F 21/106 |

OTHER PUBLICATIONS

International Search Report and Written Opinion for PCT/US2014/052479, ISA/EPO, dated Feb. 25, 2015, 12 pgs.

*Primary Examiner* — Sara Addisu
(74) *Attorney, Agent, or Firm* — Robert L. McDowell

(57) ABSTRACT

A low profile peripheral cutter (18) with stick blades (6). The cutter has a cutter body (30) and a flexible clamping disk (20) to clamp all blades. The flexible clamping disc includes a slot (24) between each cutting blade (6) in order to provide a plurality of blade clamping web wings (26) each of which acts like a deflection beam to hold the blades in position. Preferably, each web wing (26) covers one stick blade (6) and each web wing has two contacting pads (36, 38) to press each blade into its seating surface (44, 46) thereby holding the blade in position.

14 Claims, 10 Drawing Sheets

(51) Int. Cl.
*B23C 5/08* (2006.01)
*B23F 21/10* (2006.01)

(58) Field of Classification Search
CPC ... B23C 5/2493; B23C 2210/161; B23C 5/08; B23C 5/2295
See application file for complete search history.

(56) References Cited

U.S. PATENT DOCUMENTS

| | | | | |
|---|---|---|---|---|
| 1,855,511 | A * | 4/1932 | Edgar | B23F 21/166 407/25 |
| 2,646,611 | A * | 7/1953 | Bauer | B23F 21/146 407/29 |
| 4,522,538 | A * | 6/1985 | Lindsay | B23C 5/226 407/35 |
| 4,576,527 | A * | 3/1986 | Haug | B23F 21/106 407/28 |
| 4,629,377 | A * | 12/1986 | Tlaker | B23F 21/106 407/28 |
| 4,784,538 | A * | 11/1988 | Tlaker | B23F 21/10 407/28 |
| 4,997,018 | A * | 3/1991 | Carpenter | B27L 11/005 144/176 |
| 5,062,742 | A * | 11/1991 | Haug | B23F 21/106 407/104 |
| 5,098,231 | A * | 3/1992 | Haug | B23F 21/106 407/28 |
| 5,564,967 | A * | 10/1996 | Jorgensen | B27L 11/005 144/364 |
| 5,649,579 | A * | 7/1997 | Kokko | B27L 11/005 144/162.1 |
| 5,820,042 | A * | 10/1998 | Robison | B27L 11/005 241/92 |
| 5,890,846 | A | 4/1999 | Clark et al. | |
| 6,899,493 | B1 * | 5/2005 | Russell | B23C 5/08 407/29.13 |
| 7,600,951 | B2 * | 10/2009 | Van Horssen | B23C 5/06 407/67 |
| 9,475,138 | B2 * | 10/2016 | Morrison | B23C 5/2472 |
| 9,956,627 | B2 * | 5/2018 | Stadtfeld | B23F 5/163 |
| 2001/0024599 | A1 | 9/2001 | Russell | |
| 2002/0028116 | A1 * | 3/2002 | Morgulis | B23C 5/202 407/67 |
| 2005/0232712 | A1 | 10/2005 | Hecht | |
| 2006/0174973 | A1 * | 8/2006 | Jonkka | B27L 11/005 144/176 |
| 2008/0206007 | A1 * | 8/2008 | Hughes | B23C 3/30 409/51 |
| 2009/0041553 | A1 * | 2/2009 | Burke | B23C 3/30 408/1 R |
| 2010/0139469 | A1 * | 6/2010 | Matteucci | B23C 5/006 83/495 |
| 2012/0251251 | A1 * | 10/2012 | Volokh | B23C 5/08 407/47 |
| 2012/0263547 | A1 | 10/2012 | Hobohm | |
| 2013/0022414 | A1 * | 1/2013 | Athad | B23C 5/006 407/44 |
| 2013/0149051 | A1 * | 6/2013 | Li | B23C 5/08 407/30 |
| 2013/0196578 | A1 * | 8/2013 | Arias Sucarrats | B23C 5/08 451/461 |
| 2013/0343825 | A1 * | 12/2013 | Waggle | B23C 5/08 407/51 |
| 2014/0377022 | A1 * | 12/2014 | Brieden | B23F 9/10 407/99 |
| 2015/0030397 | A1 * | 1/2015 | Heinloth | B23C 5/08 407/12 |
| 2016/0008900 | A1 * | 1/2016 | Sjoo | B23B 27/145 407/28 |
| 2016/0236286 | A1 * | 8/2016 | Heinloth | B23C 5/08 |
| 2016/0311038 | A1 * | 10/2016 | Gamble | B23C 5/08 |
| 2016/0339530 | A1 * | 11/2016 | Marsh | B23F 21/146 |
| 2017/0014922 | A1 * | 1/2017 | Ellicott | B23F 21/066 |
| 2017/0028485 | A1 * | 2/2017 | Satoh | B23C 5/08 |

* cited by examiner

1

PERIPHERAL CUTTING TOOL UTILIZING STICK BLADES

This application claims the benefit of U.S. Provisional Patent Application No. 61/873,477 filed Sep. 4, 2013, the entire disclosure of which is hereby incorporated by reference.

FIELD OF THE INVENTION

The invention is directed to cutting tools for gears and in particular to peripheral milling and skiving cutters with stick-type cutting blades.

BACKGROUND OF THE INVENTION

Peripheral cutter heads are known to be used for the machining of cylindrical and bevel gears as well as for general milling operations on universal mills or five axis machine tools. Most peripheral milling cutters are solid cutters, consisting of one piece and usually made of high speed steel. Other peripheral cutter designs utilize carbide inserts which are mounted or brazed into pockets on one or both sides along the outside diameter of a disk shaped cutter head. The base material in case of carbide inserts is usually case hardened steel. Carbide inserts mounted or brazed onto the outer circumferential surface of a disk-shaped cutter head is also a commonly used design.

In milling with a disk shaped cutting tool having inserts on the circumference thereof, the depth of cut may depend in part on the radial length of the cutting edges. Since standard carbide inserts are usually available with a cutting edge length of less than about 20 mm, it is common in such cutters to stagger two or more inserts radially with a certain overlap in order to allow cutting depths which are deeper than a single insert (e.g. deeper than 20 mm). If a large cutting depth is required without the need of a chip width that matches the cutting depth, then it is possible to gradually work into a recess, notch or tooth slot in several passes if the cutter profile behind the cutting edges has a sufficiently low profile and clears the already machined surface.

In order to provide deep cuts with long cutting edges, it is also possible to utilize stick blades, which are radially oriented. Depending on the amount of stick-out of the blade tips versus the outer diameter of the cutter disk and the angle of the cutting edges versus the axis of rotation, it is possible to achieve cutting edges which are, for example, 50 mm and longer considering readily available carbide stick dimensions.

Stick blades can be re-sharpened depending on their length between 30 and 150 times. This, and the fact that the grinding of the blade profiles can realize individually customized blade angles makes the stick blade system principally very attractive for the use in peripheral cutters. However, the application of stick blades has not been heretofore successful due to the fact that the stick blades had to be clamped firmly between at least two of their sides. Stick blade clamping commonly requires a rigid blade mounting slot surrounding the stick blade with provisions for clamping the stick blade using a clamp block and a clamp screw. Rigid surroundings, clamp block and clamp screw in a peripheral cutter require significant space in the direction of the cutter axis.

To date, existing stick blade peripheral cutters comprise a cutter head having a significant amount of material in the axial region between the cutting blades and the front end of the cutter (as viewed facing a cutter positioned on a machine). Such material increases the axial dimension (i.e. thickness) of the cutter and limits the axial feed amount of the cutting blades since the amount of axial travel must be constrained in order to avoid collisions between the front of the cutter and machine components. Additionally, cutting depths which are larger than the length of the cutting edge (notches, recesses or gear teeth) cannot be realized with existing peripheral stick blade cutters due to the significant axial cutter dimension forward of the cutting blades.

SUMMARY OF THE INVENTION

The invention relates to a low profile peripheral cutter with stick blades. The cutter comprises a cutter body and a flex disk to clamp all blades wherein the flex disc includes a plurality of slots between each blade seat in order to provide a plurality of blade clamping web wings each of which acts like a deflection beam to hold the blades in position. Preferably, each web wing covers one stick blade. Preferably, two contacting pads per flex disk web wing press each blade on its clamping surface to hold the blade in position.

DETAILED DESCRIPTION OF THE PREFERRED EMBODIMENT

Figure 1:
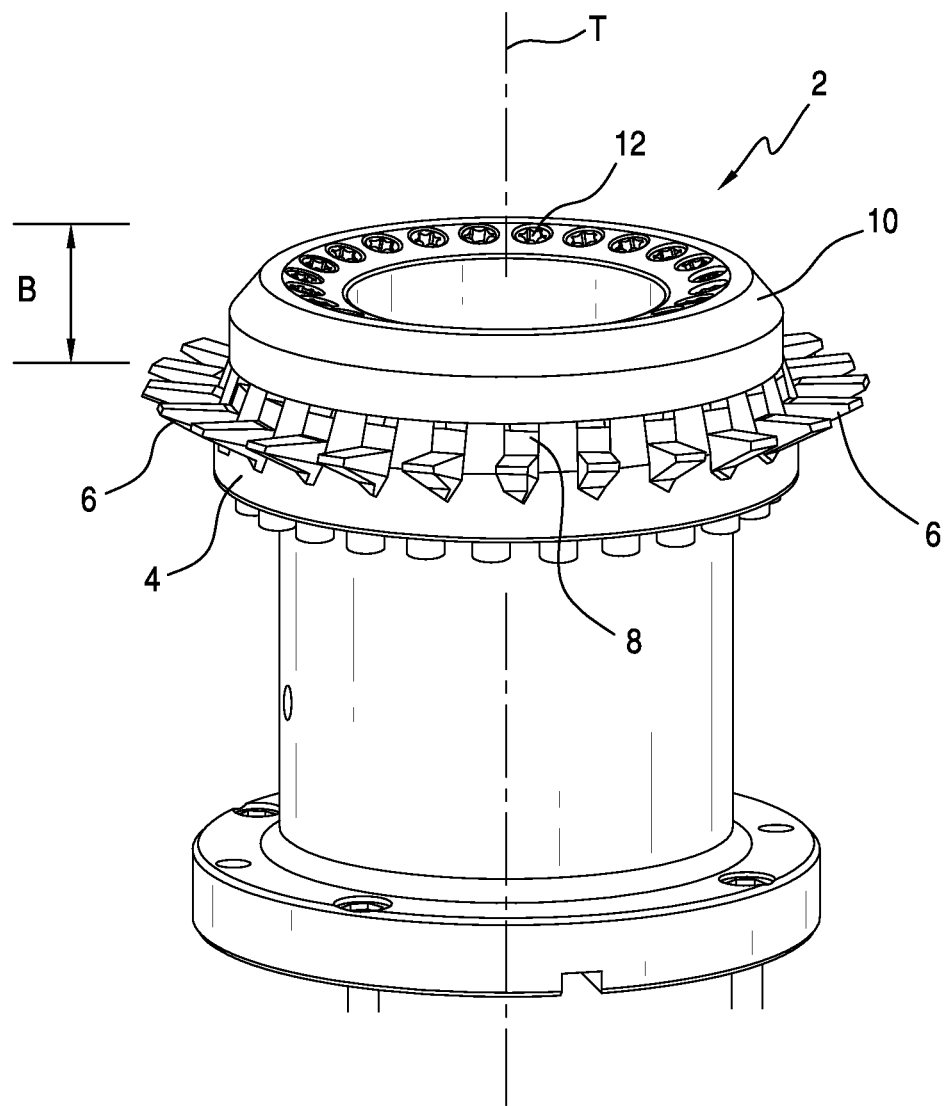
FIG. 1 shows a conventional peripheral cutter head with stick blades.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

FIG. 1 shows a conventional peripheral cutting tool 2 removably secured to a spindle of a machine tool (not shown) such as that disclosed in U.S. Pat. No. 6,712,566 for example. The cutting tool 2 comprising a cutter head 4 with a plurality of stick blades 6. A clamp block 8 is located above each stick blade. The cutter in FIG. 1 has a top ring 10 above the clamp blocks 8 with integrated clamp screws 12. The arrangement of clamp blocks 8, top ring 10 and clamp screws 12 creates a considerable cutter head build-up, B, in the axial direction forward of the cutting blades. A tangent extension of the cutting edge towards the center of the cutter finds interference rather than clearance from the point where the stick blade exits the slot on the outer cutter diameter.

Figure 2:
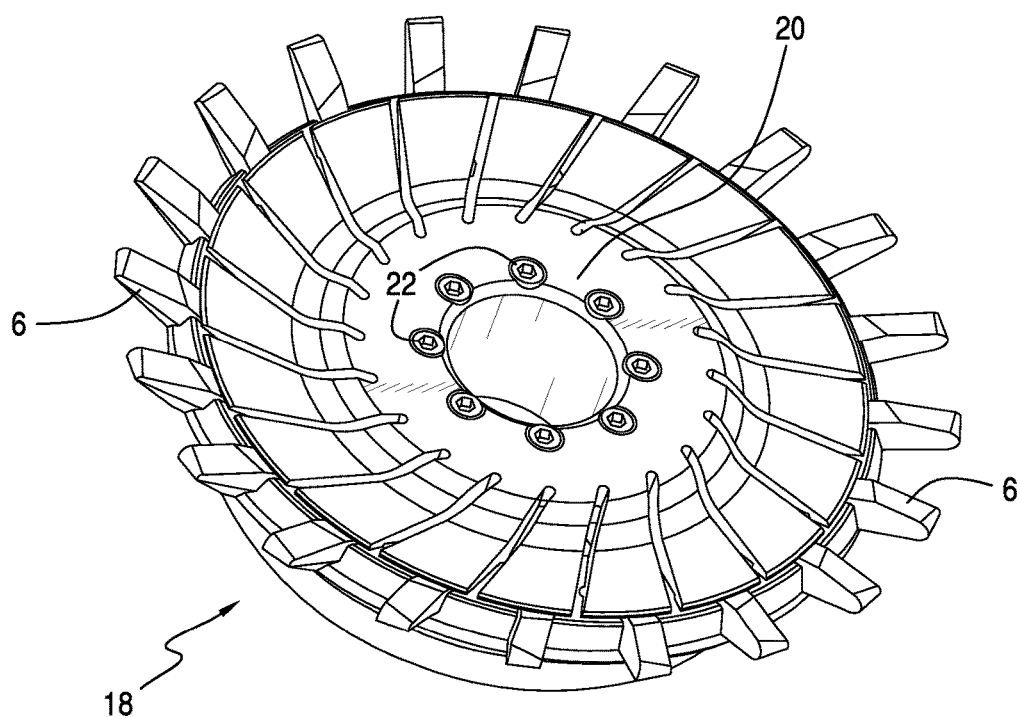
FIG. 2 shows a three dimensional view the inventive slim, low profile peripheral cutter.

The invention relates to a low profile peripheral cutter 18 with stick blades 6 (also known as "bar blades") as shown in FIG. 2. In order to avoid large wall thicknesses required to accommodate individual clamp blocks and/or clamp screws for each stick blade as in the prior art, an inventive flexible clamping disk 20 (hereafter flex disk) is utilized in order to clamp all blades 6 with one or more clamp screws 22 at or around the center of the cutter flex disk. FIG. 2 shows a three dimensional view the inventive low profile peripheral cutter with the flex disk 20 located adjacent to the top or inner surface 33 of cutter body 30 and covering the blade shanks of cutting blades 6 within the area of the cutter 18.

Figure 3:
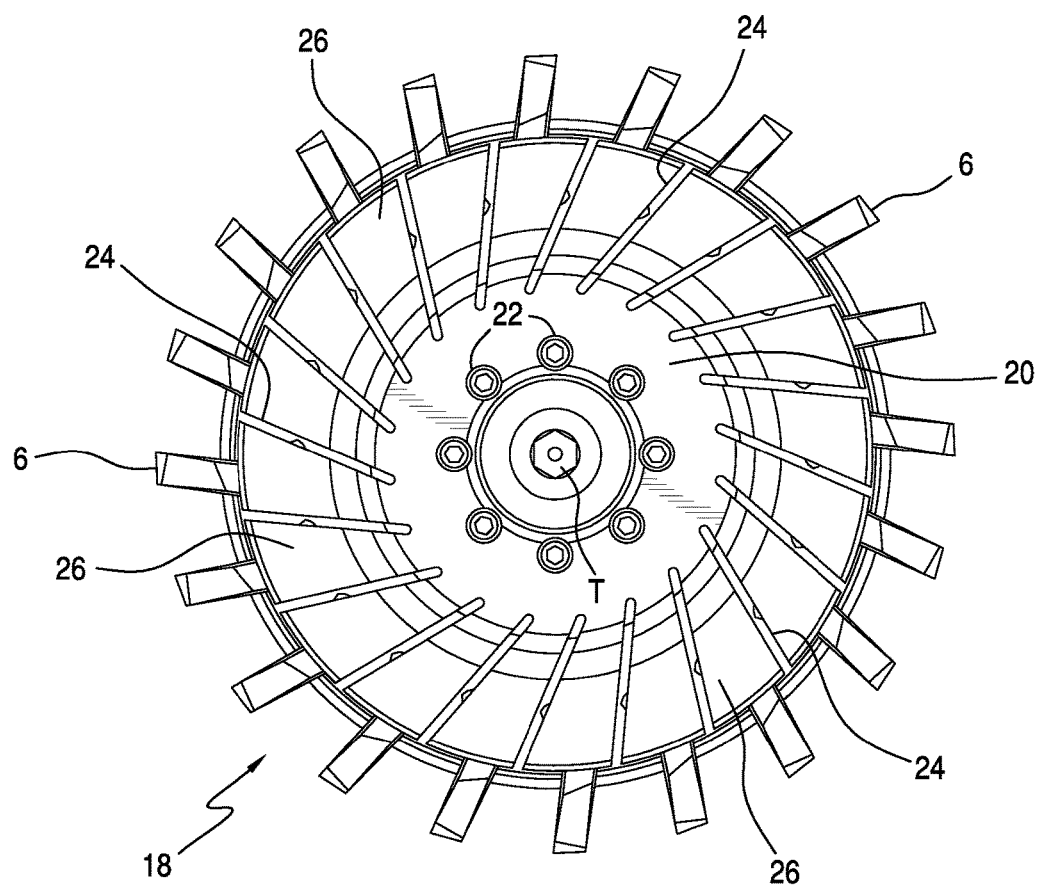
FIG. 3 shows a top view onto the low profile peripheral cutter

In order to accommodate the individual size variations within the tolerances of stick blades as well as tolerances in the cutter seating surfaces, FIG. 3 shows a top view of cutter 18 wherein the inventive flex disk 20 comprises a plurality of slots 24. The flex disk 20 is positioned such that a slot 24 is located between all of the blade seats (48 in FIG. 6) of cutter body 30 in order to provide a plurality of blade clamping web wings 26 each of which acts like a deflection beam. In other words, a slot 24 exists between a seating surface and a successive seating surface. In an assembled cutter, a slot 24 will be located between all of the cutting blades 6. Slots 24 extend through the thickness of the flex disk 20 and are spaced about the flex disk, preferably equidistantly. The slots 24 extend inward from the periphery of the flex disk 20 and have a length of generally about 50 percent of the radius of the flex disk. The direction of the slots 24 is dependent upon the orientation of the cutting blades 6 and the seating surfaces 48 of the cutter body 30.

Figure 4:
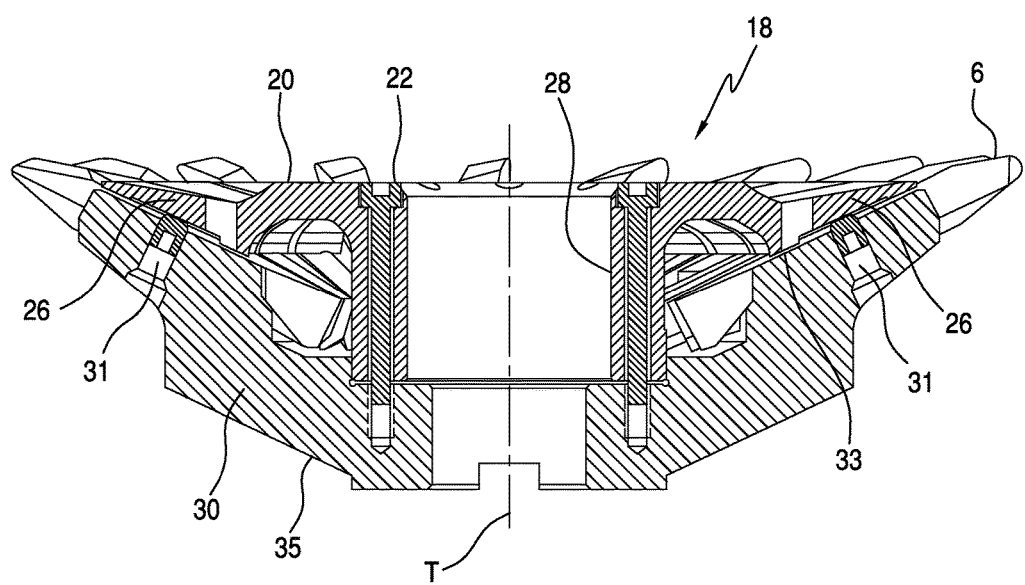
FIG. 4 shows a cross sectional view of the low profile cutter

The slots 24 between the cutting blades 6 provide individual flexible web wings 26 which each hold a respective cutting blade in position when the center screws 22 (eight in this example) are torqued. Each web wing 26 preferably covers one particular stick blade 6 preferably at a side of the cutting blade opposite to the side of the blade having one or more seating surfaces. However, a web wing 26 may cover and clamp 2 or more cutting blades and in such instances, the number and position of slots 24 would be adjusted accordingly. FIG. 4 shows a cross sectional view of the low profile cutter 18. Preferably, two contacting pads 36, 38 (FIG. 5(a)) on the inner surface of each disk wing 26 press each blade 6 on its clamping surface into position. Alternatively, one contacting pad, or more than two contacting pads, may be utilized on each web wing 26. Jack screws 31, which extend from the outer surface 35 to the inner surface 33 of cutter body 30, are backed out in this view.

Figure 5A:
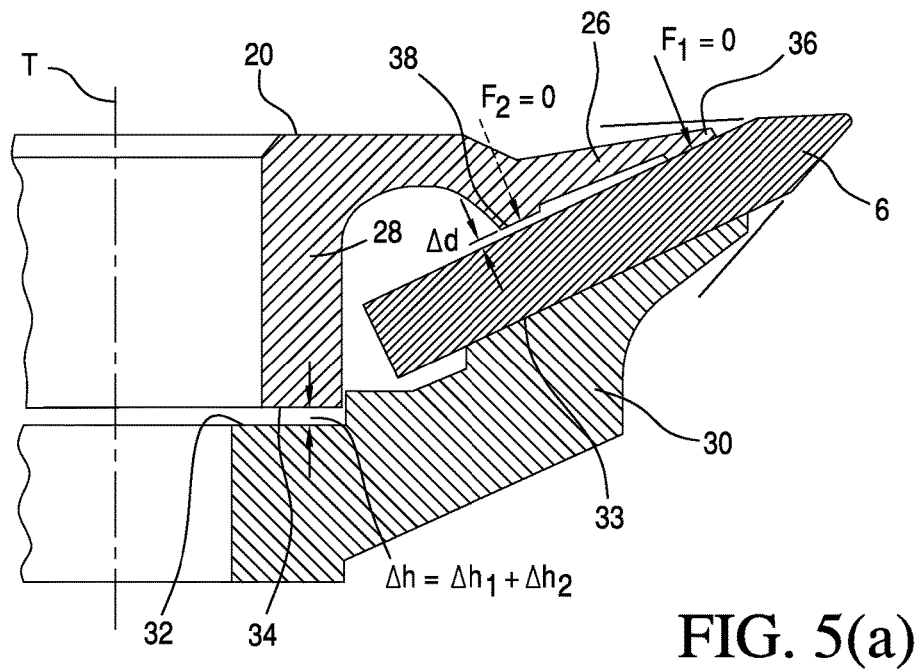
FIG. 5(a) shows the two point clamping principal upper clamping pad just contacting

As shown in FIGS. 4 and 5(a), the center hub 28 of the flex disk 20 has a length such that it doesn't contact the locating surface 32 on the cutter head body 30 when the disk is placed in position to hold the blades 6. The screws 22 which are positioned in the hub wall have to be torqued (i.e. tightened) such that the initial gap $\Delta h$ between the face 34 of the hub 28 and the locating face 32 on the cutter body 30 is reduced to zero. $\Delta h$ consists of two components $\Delta h_1$ and $\Delta h_2$. The inner side of each web wing 26 has, preferably, two clamping and contacting pads 36, 38 (FIG. 5(a)) which act to clamp the cutting blades 6. The contacting pad 36 closer to the cutting edge of the stick blade 6 has an initial contact when the flex disk 20 is placed in its position on the cutter body. At this stage of cutter assembly, the second contacting pad 38 (closer to the end of the blade which is opposite to the cutting edge) has a gap to the blade clamping surface of $\Delta d$ and the gap between the lower hub face 34 and the locating face 32 on the cutter body 30 is $\Delta h$. The clamping screws 22 (not shown in FIG. 5(a)) are not torqued. As the hub screws 22 are torqued, the gap $\Delta d$ will be closed and simultaneously therewith, the gap between the lower hub face 34 and the locating surface 32 will be reduced from $\Delta h$ to $\Delta h - \Delta h_1 = \Delta h_2$. Preferably, the flex disk 20 is manufactured from a linear elastic material such as through-hardened spring steel. The gap reduction of $\Delta d$ to zero is determined such that the contacting force of the upper pad 36 builds up to a predetermined amount (e.g. 9000 N) as shown in FIG. 5(b).

Figure 5B:
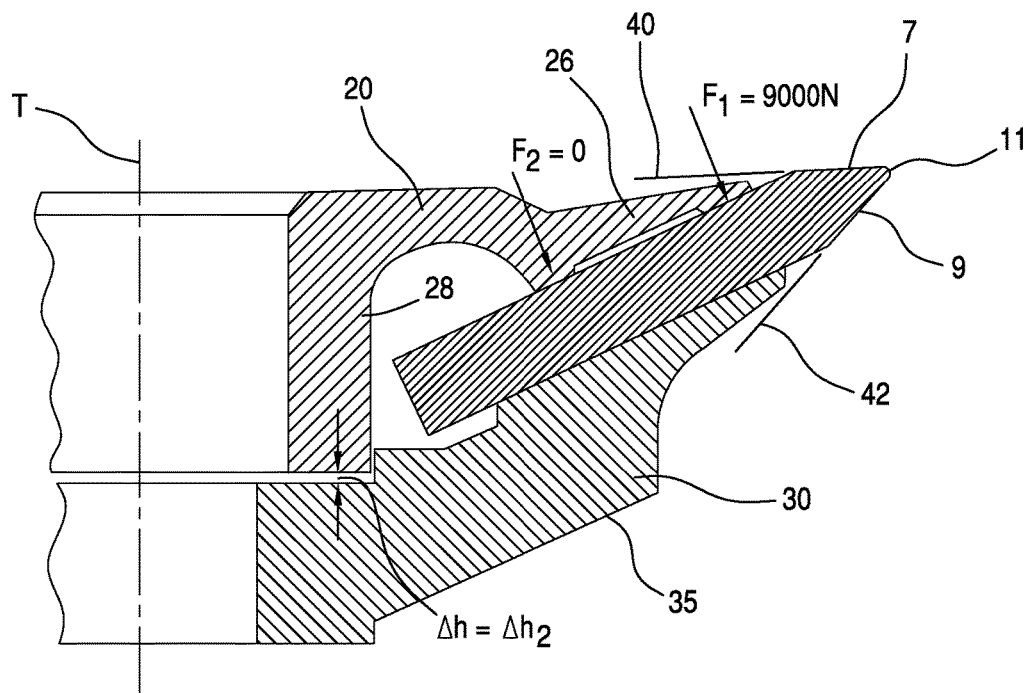
FIG. 5(b) shows the two point clamping principal partially clamped

FIG. 5b shows the two point clamping principle partially torqued such that the lower clamping pad 38 just contacts the clamping surface of the blade 6 without force. The elastic deflection due to the partial torqueing creates a clamping force $F_1$ at the upper clamping pad 36 (9000 N in this example). The gap between the lower hub face 34 and the locating face 32 on the cutter body 30 is now $\Delta h_2$.

Figure 5C:
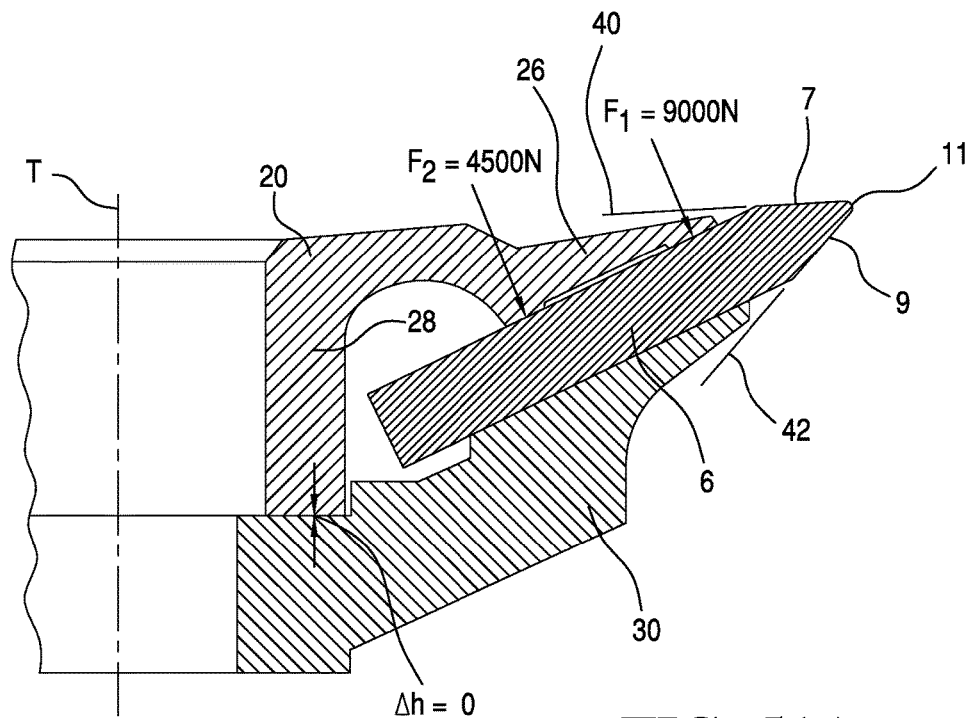
FIG. 5(c) shows the two point clamping principal completely clamped

As seen in FIG. 5(c), the continuation of the hub screw torqueing will close the gap $\Delta h_2$ between the lower hub face 34 and the locating face 32 on the cutter body 30. The gap $\Delta h_2$ is determined such that the linear elastic characteristic of the flex disk material will build up an additional clamping force (e.g. 4500 N) at the lower contacting pad 38. This second part of the blade clamping action may influence the clamping force of the upper pad 36 to a small extend (e.g. lower it) which can be compensated in the initial gap determination of $\Delta d$. The hub screws 22 in the flex disk 20 are preferably torqued together in a sequence e.g. applying a cross pattern. While the torqueing sequence is applied, the gap $\Delta h$ is closed in one step, without regard to the first and second clamping force on the upper pad 36 and lower pad 38.

FIG. 5(c) shows the two point clamping principle after the clamping screws 22 in the hub 28 of the flex disk 20 are completely screwed in and torqued to a specified value. The gap between the lower hub face 34 and the locating face 32 on the cutter body 30 is now Δh=0. The additional elastic deflection generated a force $F_2$ (4500 N in this example). The cross influence of the deflection between the clamping pads 36, 38 and the deflection between the lower clamping pad 38 and the lower hub face 34 has to be considered. The design of the flex disk 22 may be optimized in order to keep the contacting force at the upper clamping pad 36 at its initial value. It is also possible to increase or reduce the gap Δd such that the upper clamping pad 36 develops the desired force at the point when the gap Δh closes. Also, the gap Δh may have to be optimized in order to assure the desired clamping force at the lower clamping pad 38 at the point the gap Δh closes after torqueing the clamping screws 22 in the hub disk 28.

It is possible to initially place cutting blades 6 in their respective slots (contacting the seating surfaces) in the cutter body 30, position the flex disk 20 in its place with the clamp screws 22 lined up with the corresponding tapped holes in the cutter body 30 and only rotate the screws 22 to a hand tight fit. In this condition, it is possible to slide the cutting blades in their lengthwise direction (i.e. cutting blade axial direction) to a pre-determined position and assure that the tips of all blades have the same distance to the center of the cutter. After this axial location of the stick blades 6, the hub screws 22 can be torqued to a specified torque. This will close the gap Δh and secure the clamp screws 22 from loosening during the use of the cutter 18 in a cutting operation. An as example, a cutter having a diameter of 9 inches (228.6 mm) may have gap dimensions and deflections as follows: Δd=0.75 mm, $Δh_1$=0.80 mm, $Δh_2$=0.12 mm and Δh=0.92 mm.

During assembly of the cutter (also known as cutter "building"), the stick blades 6 may have a tendency to shift in their axial direction by small amounts. Such a shift may result in a condition known as radial cutter runout or tip runout. A final step in cutter building may be to include trueing of the cutter. After the radial blade tip locations are measured, the cutting blades have to be moved axially by small amounts to a corrected position which is called truing. In conventional peripheral stick blade cutters, each blade is secured with one or two clamp screws. This allows loosening of one (or perhaps both) clamp screws and sliding an individual blade in its corrected position, without influencing any of the other blades. The radial repositioning of a single blade without influence to the secure clamping of any of the other blades clamped by the inventive flex disk 20 is not possible with loosening one or more of the flex disk hub screws 22. If one hub screw is loosened, none of the blades 6 will be freed up to allow axial movement. If several adjacent hub screws 22 are loosened, several blades may be freed up and even undergo some small movements only by the relaxing of the clamping pads.

The invention overcomes the above disadvantages by unclamping cutting blades via the utilization of jack screws 31 (FIG. 4) located in the back of cutter body 30. Each jack screw 31 is oriented alongside of a blade opposite a clamping web 26 at a location where the clamping web wing 26 is wider than the stick blade 6 and provides enough surface area for a firm and defined contact between the tip of the jack screw 31 and the web wing 26. In order to move an individual blade 6 axially by small or large amounts (even to replace it with a different blade) the jack screw is torqued from the back just enough to loosen the particular blade. Then the blade can be freely moved to the desired position and the jack screw is released which will again clamp the particular blade securely in the desired position.

The inventive cutter body design in combination with the inventive flex disk and un-clamp principle solves the problem of creating a low profile peripheral cutter head which has clearance behind the extension of the cutting edges towards the center of the cutter head. The inventive cutter 18 may be equipped with one kind of blades (e.g. cutting edges only on the top side 7, only the bottom side 9, or on both sides 7, 9 of the cutter as shown in FIG. 5(b)) or with an alternate blade arrangement (e.g. one blade with cutting edge on the top side 7 and the following blade with cutting edge on the bottom side 9 and so on). With the cutting blades described above, all or part of the tip edge 11 may also be used for cutting. In case of alternate blades it is important that the cutting edge tangents 40, 42 (see FIG. 5(b) for example) extend generally towards the center of the cutter and clear the cutter body 30 (at the back or bottom side) and the flex disk 20 (at the top or front side) in order to allow for the milling notches or slots, which are deeper than the length of the cutting edges.

Figure 6:
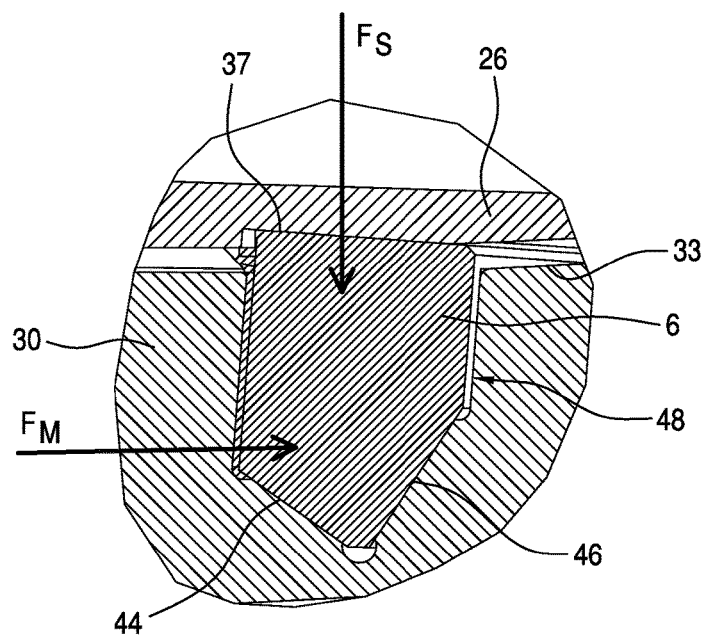
FIG. 6 shows a cross sectional view of the pentagon shaped blade cross section between its seating surfaces and the flex disk.
Figure 10:
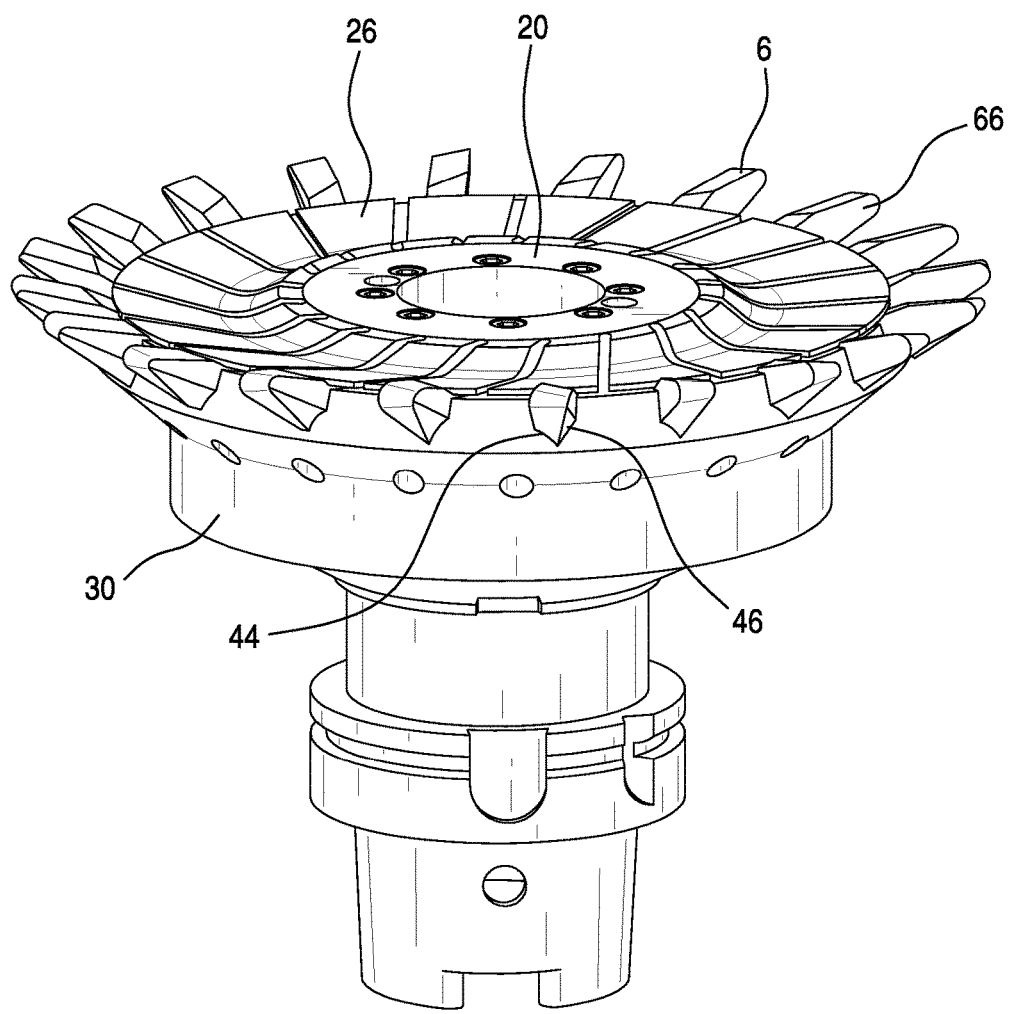
FIG. 10 illustrates an example of a cutter wherein the faces of the cutting blades are oriented in a direction generally tangential to the cutter body.

FIG. 6 shows a cross sectional view a cutting blade 6 from the cutter of FIG. 10 wherein the cutting blade 6 has a non-quadrilateral shaped blade cross-section. The cutting blade 6 is positioned against seating surfaces 44, 46 of blade mounting slot 48 in the cutter body 30 and against the bottom surface of the flex disk web wing 26. Although this arrangement provides optimal blade seating conditions due to the positive seating principle, the invention also contemplates the low profile cutter and clamping principle with stick blades that have a rectangular or square cross section and, thus, complementary shaped blade mounting slots in cutter body 30. Additionally, the bottom or inner side of each web wing 26 may also include a blade seating surface 37.

The cutter body 30 and the flex disk 20 may be formed such that the direction of orientation of cutting blades positioned therein may or may not intersect the axis T of the cutter 18. Cutting blades may be oriented to not intersect the tool axis in order to optimize the chip removal action of the cutting edges and/or allow more freedoms in grinding the blade front face. The cutting blades are preferably not perpendicular to the axis of rotation (e.g. see FIG. 4) which thereby locates the blade tips in front of the cutter front face although a perpendicular orientation of the cutting blades with respect to the cutter axis of rotation is also contemplated by the invention. The non-perpendicular positioning allows certain cutting actions and eliminates interferences in front of the cutter which could occur with the prior art cutter of FIG. 1. The blade slot inclinations as discussed above may lead to a misalignment between blade clamping surface and the conical clamp disk web wing 26 (FIG. 6). This may occur if the blade sides are in line with the cutter axis. The seating surfaces of the blades may be slightly inclined in order to find a best fit between blade seating surfaces 44, 46 of cutter body 30 and the conical flex disk web wing 26. In the example shown in FIG. 6, the bottom surface of the flex disk web wing 26 may include serrations under an appropriate angle to provide optimal clamping contact with cutting blade 6.

Figure 7:
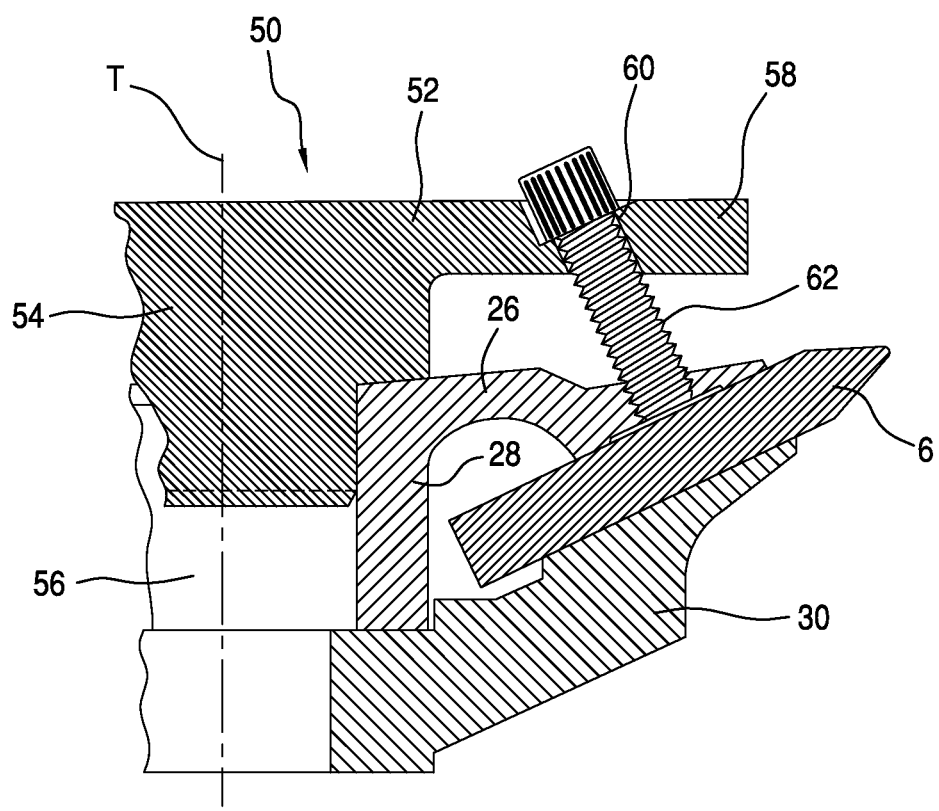
FIG. 7 illustrates an embodiment of a cutting blade unclamping feature of the invention.
Figure 8:
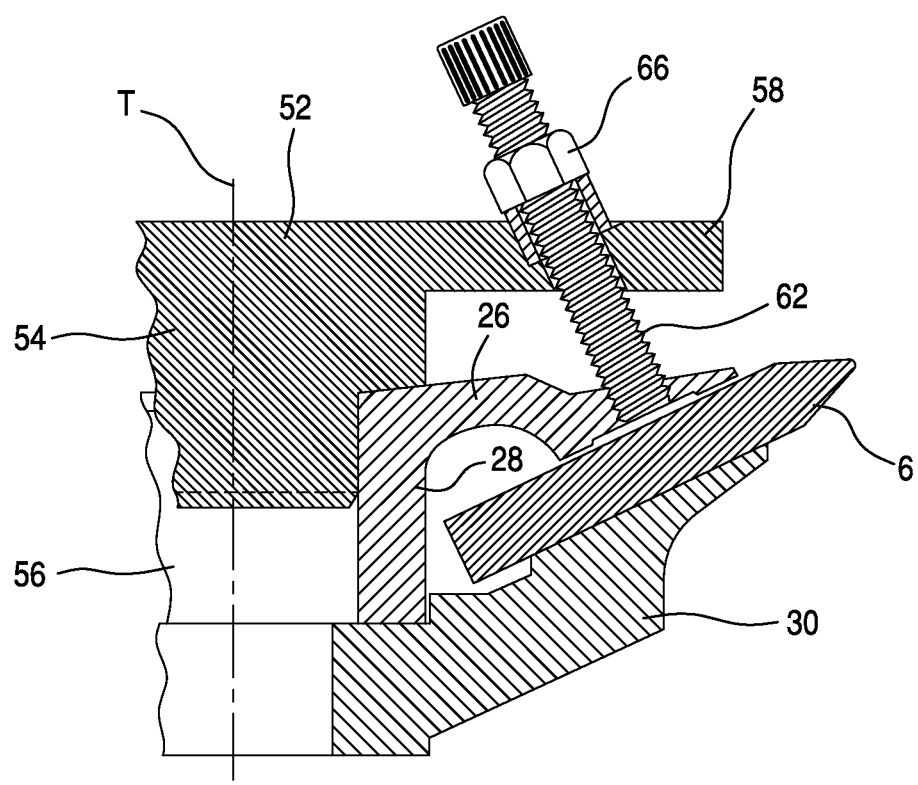
FIG. 8 illustrates another embodiment of a cutting blade unclamping feature of the invention.

FIGS. 7 and 8 show an additional feature of the invention comprising an insertable and removable unclamping device 50 for unclamping the flexible web wings 26. The device 50 comprises a body 52 having a center stepped cylindrical portion 54 insertable into the central opening 56 of the hub disk 28. The body 52 further includes a flange portion 58 extending radially outward from the cylindrical portion 54.

The flange portion 58 preferably comprises one or more threaded openings 60 appropriately oriented whereby a means such as a threaded screw 62 may pass for fitting engagement with a bore 64 in web wing 26 of flex disk 20. Once engaged with a web wing 26, turning of the screw 62 or nut 66 lifts the web wing 26 away from the cutting blade 6 thereby allowing axial adjustment of the blade or even removal of the blade for replacement. Device 50 may have one opening for positioning above a desired web wing 26 or it may have a plurality of openings (e.g. the same number as web wings 26 on a flex disk 20). When not in use, the device 50 is removed from the central opening 56.

Figure 9:
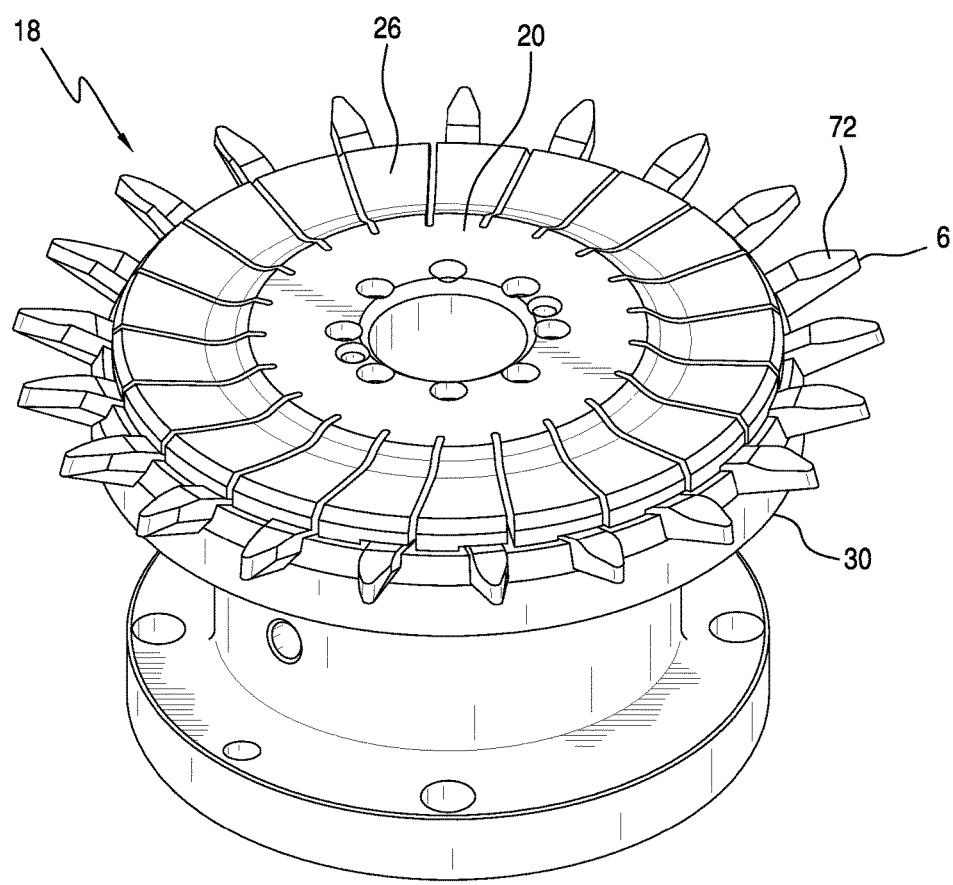
FIG. 9 illustrates an example of a cutter wherein the faces of the cutting blades are oriented in a direction generally forward of the cutter.

The front faces of the cutting blades 6 may be oriented in different directions as shown in FIGS. 9 and 10. FIG. 9 shows cutting blades 6 having their respective front faces 72 (and associated cutting and/or clearance edges) oriented in a direction generally forward of the cutter 18 and flex disk 20 (i.e. generally in the direction of axis T). Cutters of this type are, for example, suitable for processes for producing gears by skiving, including roughing and finishing skiving processes. The approximate force direction of skiving is shown in FIG. 6 as $F_S$. The force, $F_S$, preferably presses the cutting blade 6 into both seating surfaces 44, 46. Depending on the force direction and/or the orientation of the blade mounting slot 48 in cutter body 30, $F_S$ may by symmetric to the seating surfaces, which is preferred.

In FIG. 10, the front faces 66 of the cutting blades 6 (and associated cutting and/or clearance edges) are oriented in a direction generally tangential with respect to the cutter body 30 and flex disk 20. Cutters of this type are, for example, suitable for processes of producing gears by milling. The approximate force direction of milling is shown in FIG. 6 as $F_M$. The force, $F_M$, preferably presses the cutting blade 6 against the steeper seating surface 46.

In the cutters of FIGS. 9 and 10, four-sided or non-quadrilateral cutting blades may be utilized. For non-quadrilateral cutting blades, regardless of the direction of orientation of the front faces of the cutting blades, it is preferred to provide angled seating surfaces 44, 46 (i.e. non-perpendicular with respect to one another) in the cutter body 30 as shown in FIG. 6. Such seating surfaces enhance the stability of the cutter during a cutting process.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A clamping arrangement for a cutting tool in which one or more cutting blades are positionable, said clamping arrangement comprising a flexible clamping disk in combination with a cutter body, said clamping arrangement being rotatable about an axis or rotation, said flexible clamping disk comprising:
   an outer surface, an inner surface, a periphery and a center, said axis of rotation extending through said center, said inner surface of the clamping disk facing an inner surface of the cutter body,
   a plurality of slots spaced about the clamping disk and extending inwardly from said periphery, said plurality of slots defining a plurality of clamping web wings with a single clamping web wing being defined between two successive slots.

2. The clamping arrangement of claim 1 further including one or more openings for clamping screws spaced about said center.

3. The clamping arrangement of claim 1 wherein the inner surface of each web wing includes one or more contacting pads.

4. The clamping arrangement of claim 1 wherein each of said slots have a length equal to about 50 percent of the radius of the clamping disk.

5. The clamping arrangement of claim 1 wherein the inner surface of each web wing includes a cutting blade seating surface.

6. The clamping arrangement of claim 1 wherein each web wing is of a size and orientation to clamp a single cutting blade.

7. The clamping arrangement of claim 1 wherein said cutter body comprises at least one cutting blade seating surface arranged in its inner surface at a predetermined orientation and wherein said slots of said clamping disk are arranged at the same orientation.

8. The clamping arrangement of claim 7 further comprising at least one cutting blade positioned in said at least one seating surface and clamped by said clamping disk.

9. The clamping arrangement of claim 8 wherein said at least one cutting blade includes a front face with said front face being oriented in a direction facing outward from said outer surface of said clamping disk.

10. The clamping arrangement of claim 8 wherein said at least one cutting blade includes a front face with said front face being oriented in a direction generally tangential with respect to said outer surface of said clamping disk.

11. The clamping arrangement of claim 8 wherein the inner surface of each web wing includes two contacting pads and wherein each web wing is capable of deflecting during clamping whereby said two contacting pads sequentially contact said at least one cutting blade.

12. The clamping arrangement of claim 11 wherein said cutting blade includes an outer surface facing away from the clamping disk in the direction of said axis of rotation, and wherein a portion of the outer surface of said web wing between said two contacting pads is located whereby a tangent to said outer surface of said cutting blade does not contact said portion of said web wing.

13. The clamping arrangement of claim 7 wherein said at least one seating surface of said cutter body includes a pair of angled seating surfaces oriented non-perpendicular with respect to one another.

14. The clamping arrangement of claim 1 wherein said cutter body includes a jack screw aligned with and capable of contacting and moving each web wing thereby enabling movement of a cutting blade.

* * * * *